(12) United States Patent
Hatori et al.

(10) Patent No.: US 7,748,287 B2
(45) Date of Patent: Jul. 6, 2010

(54) DUAL CLUTCH TRANSMISSION APPARATUS

(75) Inventors: Hiroki Hatori, Nishio (JP); Yuichi Fukuhara, Toyoake (JP); Toshio Tanba, Kariya (JP); Shiro Ogami, Kariya (JP)

(73) Assignee: Aisin Ai Co., Ltd., Nishio-Shi, Aichi-Ken (JP)

( * ) Notice: Subject to any disclaimer, the term of this patent is extended or adjusted under 35 U.S.C. 154(b) by 445 days.

(21) Appl. No.: 11/761,792

(22) Filed: Jun. 12, 2007

(65) Prior Publication Data
US 2007/0283775 A1    Dec. 13, 2007

(30) Foreign Application Priority Data
Jun. 12, 2006   (JP)   ............... 2006-162354

(51) Int. Cl.
*F16H 3/38* (2006.01)
(52) U.S. Cl. .................................. 74/340; 74/331
(58) Field of Classification Search ........... 74/329–331, 74/340
See application file for complete search history.

(56) References Cited

U.S. PATENT DOCUMENTS 6,766,705 B1 *  7/2004  Hall, III ................. 74/331

FOREIGN PATENT DOCUMENTS

| JP | 2003-148602 A | 5/2003 |
| JP | 2006-002789 A | 1/2006 |

* cited by examiner

*Primary Examiner*—David D Le
*Assistant Examiner*—Derek D Knight
(74) *Attorney, Agent, or Firm*—Buchanan Ingersoll & Rooney PC

(57) ABSTRACT

A dual clutch transmission apparatus includes a first input shaft, a second input shaft arranged coaxially with the first input shaft and freely rotatable, a first counter shaft and a second counter shaft arranged in parallel with the first and the second input shafts, a dual clutch including a first clutch and a second clutch, the first and the second clutches transmitting rotational torque from a power source to the first and the second input shafts respectively, a first gear change mechanism provided between the first and the second input shafts and the first counter shaft, a second gear change mechanism provided between the first and the second input shafts and the second counter shaft and an output shaft connected to the first and the second counter shafts via a first reduction gear train and a second reduction gear.

6 Claims, 2 Drawing Sheets

F I G. 3

| | Dual clutch 12 | | 1st clutch 30A | | | 2nd clutch 30B | | | 4th clutch 30D | | | 3rd clutch 30C | | |
|---|---|---|---|---|---|---|---|---|---|---|---|---|---|---|
| | C1 | C2 | S1 | N | S3 | S2 | N | S4 | S5 | N | S7 | S6 | N | SR |
| 1st | O | | O | | | | | | | | | | | |
| 2nd | | O | | O | | | | | | | | | | |
| 3rd | O | | | | O | O | | | | | | | | |
| 4th | | O | | O | | | | O | | | | | | |
| 5th | O | | | O | | | O | | | | | | | |
| 6th | | O | | O | | | O | | | O | | | | |
| 7th | O | | | O | | | O | | | | O | | O | |
| Reverse | O | | | | | | | | | | | | O | O |
| Parking | | | | | | | | | | | | | | O |

# DUAL CLUTCH TRANSMISSION APPARATUS

CROSS REFERENCE TO RELATED APPLICATIONS

This application is based on and claims priority under 35 U.S.C. §119 to Japanese Patent Application 2006-162354, filed on Jun. 12, 2006, the entire content of which is incorporated herein by reference.

FIELD OF THE INVENTION

The present invention relates to a dual clutch transmission apparatus, which is suitable to be provided at a front-engine rear-drive vehicle. More specifically, the invention relates to the transmission apparatus with which a range of changes in gear ratio may be widely and freely selected.

BACKGROUND

As an example of an automatic transmission apparatus suitable for a front-engine rear-drive vehicle, a dual clutch transmission apparatus is disclosed in JP2003-148602A (Reference 1). In this specification, the dual clutch transmission apparatus having a dual clutch mechanism, i.e., having an automatic clutch mechanism including two frictional clutches that are engaged or disengaged alternately, is disclosed.

In this dual clutch transmission apparatus, torque is firstly transmitted to a first input shaft via a first frictional clutch of the dual clutch mechanism from a drive shaft such as an output shaft of an engine, and then torque is transmitted to a second input shaft formed in a hollow shape. The second input shaft is coaxially arranged with the first input shaft on its peripheral portion. When a vehicle is driven in a normal condition, the first and the second frictional clutches of the dual clutch mechanism are controlled by a control device of the dual clutch transmission apparatus in a manner that; 1) during a shift operation, the first and the second frictional clutches are in a partial clutch engagement state, which results in one torque (corresponding to, for example the first frictional clutch) being increased and the other torque (corresponding to the second frictional clutch) being decreased at the same time, and vice versa, and 2) after the shift operation has ended, the first frictional clutches are in a completely engaged state, which results in the torque reaching a maximum value while the second frictional clutches are being disengaged and the other torque corresponds to the second frictional clutch falling down to 0 value, and vice versa. This dual clutch transmission apparatus includes a counter shaft arranged in parallel with the first and second input shafts. Multiple gear trains are arranged between the second input shaft and the counter shaft. The multiple gear trains are actuated to establish a 1st shift stage, a 3rd shift stage and a 5th shift stage, respectively. Arranged between the first input shaft and the counter shaft are multiple gear trains that are actuated to establish a 2nd shift stage, a 4th shift stage, a reverse shift stage and a low-speed shift stage for emergency. Housed in the transmission are also four switching clutches, which are used to change shift stages. The counter shaft is connected to an output shat, which extends coaxially with the first input shaft in a rearward direction of the transmission, via a final transition gear train.

The control device of this dual clutch transmission apparatus controls the first frictional clutch and the second frictional clutch to be engaged or disengaged in turns, and further the control device selects each shift stage, depending on a condition of a vehicle, such as an accelerator opening degree, and a speed of the engine, a speed of the vehicle, or the like. For example, when the condition of the vehicle matches a driving of a vehicle at the 2nd shift stage, the control device selects the 2nd shift stage and the first frictional clutch so that a driving of a vehicle at the 2nd shift stage is achieved. When the condition of the vehicle matches a driving of a vehicle at the 3rd shift stage, for example, because of an accelerator opening degree increasing, the control device selects the 3rd shift stage and the second frictional clutch so that the driving of the vehicle at the 2nd shift stage is changed to a driving of the vehicle at the 3rd shift stage. Likewise, the control device selects either the first frictional clutch or the second frictional clutch in turns as well as selecting a gear train appropriate to a condition of the vehicle, wherein the vehicle drives at a shift stage appropriate to a condition of the vehicle. When a speed of the vehicle declines while the vehicle is in motion at the 1st shift stage, the control device selects the gear train for the low-speed shift stage for emergency and the first frictional clutch so that a driving mode of the vehicle is changed to a low-speed driving mode for emergency. The above-mentioned operation is achieved when a shift lever is set to be at a forward movement position. However, when the shift lever is set to be at a reverse movement position under the condition that the vehicle is temporarily stopped, the control device selects the gear train for the reverse shift stage and the first frictional clutch so that the vehicle can reverse.

In the dual clutch transmission apparatus disclosed in Reference 1 being suitable for the front-engine rear-drive type vehicle, the first input shaft is arranged coaxially with the output shaft. On the other hand, a dual clutch transmission apparatus applicable for a use in a front-engine front-drive type vehicle is disclosed in JP2006-002789 (Reference 2, paragraphs 3-9, FIG. 8). The dual clutch transmission apparatus (Reference 2) differs from the aforementioned apparatus (Reference 1) in which, in the dual clutch transmission (Reference 2), a first intermediate shaft and a second intermediate shaft are arranged in parallel with first and second input shafts. Mounted between the first input shaft and the first and second intermediate shafts is a first gear change mechanism having plural gear trains for the 1st shift stage, the 3rd shift stage, the 5th shift stage and the 7th shift stage. Mounted between the second input shaft and the first and second intermediate shafts is a second gear change mechanism having plural gear trains for the 2nd shift stage, the 4th shift stage and the 6th shift stage. Mounted between the first input shaft and the second intermediate shaft is a gear train for the reverse shift stage.

According to the dual clutch transmission apparatus disclosed in Reference 1, the eight gear trains for the 1st shift stage, the 2nd shift stage, the 3rd shift stage, the 4th shift stage, the 5th shift stage, the low-speed shift stage for emergency, the reverse shift stage and the final transmitting gear train are mounted between the two input shafts, the output shaft and the counter shaft, and further, the four switching clutches are provided at the apparatus. These components are all arranged in series along the axis. As a result, the axial length of the gearbox becomes larger, and the number of gears is increased with respect to the number of shift stages. Meanwhile, in the apparatus disclosed in Reference 2, mounted on the two input shafts, the single output shaft and the two intermediate shafts, arranged in parallel therewith, are nine gear trains for the 1st shift stage, the 2nd shift stage, the 3rd shift stage, the 4th shift stage, the 5th shift stage, the 6th shift stage, the 7th shift stage, the reverse shift stage and the final transmitting gear train, and the four switching clutches. The components, which are partially arranged in parallel, are all arranged along the axis in series. As a result, although the axial length of the gearbox is shortened, it may be difficult to adapt the apparatus disclosed in Reference 2 to the front-engine rear-drive type vehicle as it is. Additionally, gears, whose diameter differs largely from each other within each gear train, need to be provided at dual clutch transmission apparatuses disclosed in JP2003-148602A and in JP2006-002789 so that a range of changes in gear ratio, which is obtained by the number of rotations of the driven-wheel-side shaft being divided by the number of rotations of the engine-side shaft, may be widely and freely selected. However, there are limits on diameter of gears to be minimized. Therefore, the transmission apparatus may become larger.

A need thus exists to provide a dual clutch transmission apparatus applicable for a use in a front-engine rear-drive type vehicle, and the dual clutch transmission apparatus with which a range of changes in gear ratio may be widely and freely selected and further, with the dual clutch transmission apparatus, the size of the transmission apparatus being arranged to become smaller by changing a configuration of each gears of the apparatus.

SUMMARY OF THE INVENTION

According to an aspect of the present invention, a dual clutch transmission apparatus includes a first input shaft, a second input shaft arranged coaxially with the first input shaft and freely rotatable, a first counter shaft arranged in parallel with the first and the second input shafts, a second counter shaft arranged in parallel with the first and second input shafts, a dual clutch including a first clutch and a second clutch, the first clutch transmitting rotational torque from a power source to the first input shaft and the second clutch transmitting the rotational torque from the power source to the second input shaft, a first gear change mechanism provided between the first and the second input shafts and the first counter shaft, a second gear change mechanism provided between the first and the second input shaft and the second counter shaft and an output shaft connected to the first and the second counter shafts for transmitting the rotational torque from the power source to a driving wheel; wherein the output shaft is connected to the first input shaft via a first reduction gear train and to the second input shaft via a second reduction gear.

BRIEF DESCRIPTION OF THE DRAWINGS

The foregoing and additional features and characteristics of the present invention will become more apparent from the following detailed description considered with reference to the accompanying drawings, wherein:

FIG. 3 is a table explaining a shift operation in accordance with FIG. 1.

DETAILED DESCRIPTION

Figure 1:
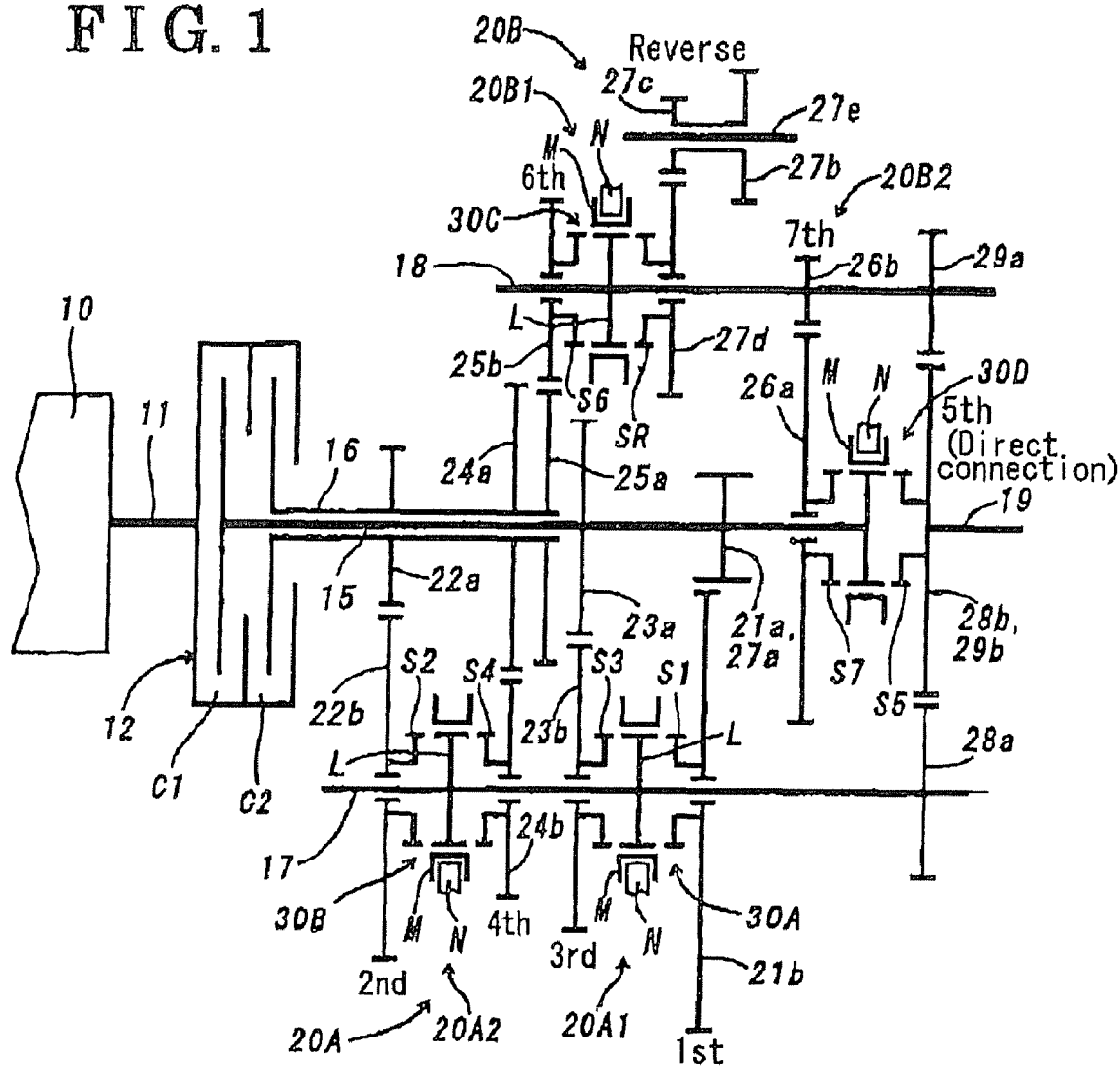
FIG. 1 is a view schematically illustrating an entire structure of a dual clutch transmission apparatus according to an embodiment of the present invention.

An embodiment of the present invention will be explained in accordance with the attached drawings. According to an embodiment of the present invention, the present invention is applied to a dual clutch transmission apparatus having, for example, seven forward shift stages and one reverse shift stage. A shown in FIG. 1, the dual clutch transmission apparatus according to the embodiment includes a first input shaft 15, a second input shaft 16 formed in a hollow shape and rotatably surrounding the first input shaft 15, a first counter shaft 17 arranged in parallel with the first input shaft 15 and the second input shaft 16, a second counter shaft 18 arranged in parallel with the first input shaft 15 and the second input shaft 16, and an idle shaft 27e for reverse operation arranged in parallel with the second counter shaft 18. The first input shaft 15 penetrates through the second input shaft 16 formed in a hollow shape and extends in a rearward direction. The dual clutch transmission apparatus further includes an output shaft 19, which is coaxially arranged at end portion of the first input shaft 15. The output shaft is linked to driving wheels. A first frictional clutch (first clutch) C1 and a second functional clutch (second clutch) C2 are rotatably actuated by a power source 10, such as an engine, via a driving shaft 11. The first input shaft 15, which is connected to the first frictional clutch C1, is rotatably driven in response to the operation of the first frictional clutch C1. Likewise, the second input shaft 16, which is connected to the second frictional clutch C2, is rotatably driven in response to the operation of the second frictional clutch C2. The first frictional clutch C1 is controlled to establish or interrupt a path for transmitting torque A, for example, to the odd gears (1st, 3rd, 5th and 7th), while the second frictional clutch C2 is controlled to establish or interrupt a path for transmitting torque B, for example, to the even gears (2nd, 4th and 6th). When a vehicle is driven in a normal condition, the first and second frictional clutches C1 and C2 of the dual clutch mechanism 12 are controlled by the control device (not shown) in a manner that; 1) during a shift operation, the first and the second clutches are in partial clutch engagement state, which results in the torque A being increased and the torque B being decreased, and vice versa, 2) and after the shift operation has ended, the first frictional clutch C1 is completely engaged, which results in the torque A of the first frictional clutch C1 reaching a predetermined maximum value while the second clutch C2 is disengaged and the torque B corresponds to the second clutch falling down to 0 value, and vice versa.

A first gear change mechanism 20A is positioned between the first counter shaft 17 and the first and the second input shafts 15 and 16. A second gear change mechanism 20B is placed between the first and the second input shafts 15, 16 and the second counter shaft 18. A fourth switching clutch 30D (switching clutch 3) is placed between the first input shaft 15 and the output shaft 19, which are coaxially arranged to each other. The fourth switching clutch 30D connects or disconnects the shafts 15 and 19. The first counter shaft 17 is linked to the output shaft 19 via a first reduction gear train (28a, 28b). The second counter shaft 18 is linked to the output shaft 19 via a second reduction gear train (29a, 29b). A driven gear is commonly used by the first and the second reduction gear trains. However, for convenience, the driven gear is described differently as the driven gear 28b and the driven gear 29b. The driven gear is fixed at a front end of the output shaft 19.

The first gear change mechanism 20A includes a first gear switching unit 20A1, which is provided at the first counter shaft 17 and positioned between the first input shaft 15 and the first counter shaft 17, and a second gear switching unit 20A2, which is provided at the first counter shaft 17 and positioned between the second input shaft 16 and the first counter shaft 17. The first gear switching unit 20A1 includes a 1st shift stage gear train (21a, 21b), a 3rd shift stage gear train (23a, 23b) and a first switching clutch 30A. The 1st shift stage gear train (21a, 21b) includes a driving gear 21a (which is also described as a reverse driving gear 27a) fixed at the first input shaft 15 and a driven gear 21b rotatably provided at the first counter shaft 17. Further, the 3rd shaft stage gear train (23a, 23b) includes a driving gear 23a fixed on the first input shaft 15 and a driven gear 23b rotatably mounted onto the first counter shaft 17.

Figure 2:
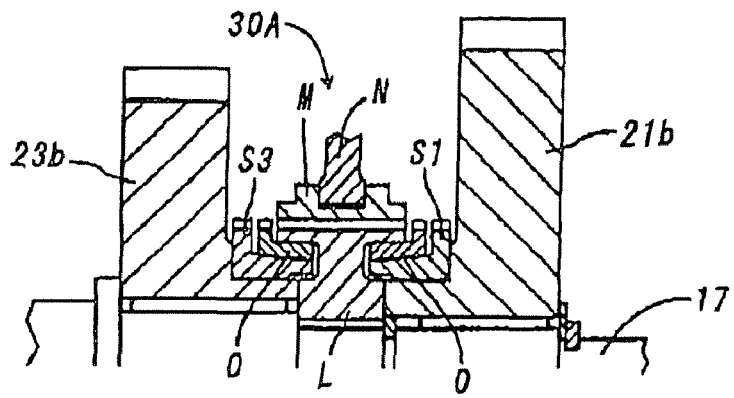
FIG. 2 is a sectional view illustrating an example of a switching clutch indicated in FIG. 1.

A known synchromesh mechanism is adapted to the first switching clutch 30A. As shown in FIG. 1 and FIG. 2, the synchromesh mechanism incorporates therein a clutch hub L spline-engaged with the first counter shaft 17 arranged between the 1st shift stage driven gear 21b and the 3rd shift stage driven gear 23b, a 1st shift stage engaging member S1 press-fitted to the 1st shaft stage driven gear 21b, a 3rd shift stage engaging member S3 press-fitted to the 3rd shift stage driven gear 23b, a synchronizer ring O interposed between the clutch hub L and each of the shift stage engaging member S1 and S2, and a sleeve M spline-engaged with an outer periphery of the clutch hub L so as to be movable in an axial direction. The synchromesh mechanisms connect in turns either the driven gear 21b or 23b to the first counter shaft 17 or to simultaneously disconnect both of the driven gears 21b and 23b therefrom. The sleeve M of the first switching clutch 30A, when being located in a neutral position as shown in FIG. 1, is engaged neither with the engaging member S1 nor with the engaging member S3. However, once the sleeve M is shifted towards the driven gear 21b of the 1st shift stage by a shift fork N fixed at a peripheral annular-shaped groove of the sleeve M, the sleeve M is firstly spline-engaged with the synchronizer ring O at the side of the first stage driven gear 21b, wherein rotation of the first counter shaft 17 is synchronized with rotation of the 1st shift stage driven gear 21b. The sleeve M is then spline-engaged with peripheral teeth of the 1st shift stage engaging member S1, wherein the first counter shaft is connected integrally with the 1st shift stage engaging member S1 so as to establish the 1st shift stage. Meanwhile, once the sleeve M is shifted towards the driven gear 23b of the 3rd shift stage by the shift fork N, rotation of the first counter shaft 17 is synchronized with rotation of the 3rd shift stage driven gear 23b, and then the first counter shaft 17 is connected integrally with the 3rd shift stage driven gear 23b so as to establish the 3rd shift stage.

The second gear switching unit 20A2 comprises a 2nd shift stage gear train (22a, 22b), a 4th shift stage gear train (24a, 24b) and a second switching clutch 30B. Similarly to the case of the above-mentioned first gear switching unit 20A1, the 2nd shift stage gear train (22a, 22b) is configured with a driving gear 22a firmly attached to the second input shaft 16 and a driven gear 22b rotatably provided at the first counter shaft 17. The 4th shift stage gear train (24a, 24b) is configured with a driving gear 24a firmly attached to the second input shaft 16 and a driven gear 24b rotatably provided at the first counter shaft 17. The second switching clutch 30B is a synchromesh mechanism configured so as to connect in turns either the driven gear 22b or 24b to the first counter shaft 17 or to simultaneously disconnect both of the driven gears 22b and 24b therefrom. The structure of the second switching clutch 30B is the same as the one of the first switching clutch 30A, except that a 2nd shift stage engaging member S2 and a 4th shift stage engaging member S4 are fixed to the 2nd shift stage driven gear 22b and the 3rd shift stage driven gear 24b, respectively. Likewise as the first switching clutch 30A, the second switching clutch 301B, when being located in a neutral position shown in FIG. 1, is engaged with none of the engaging members S2 and S4. However, once a sleeve M of the second switching clutch 30B is shifted towards the 2nd shift stage driven gear 22b by a shift fork N fixed at the sleeve M, rotation of the first counter shaft 17 is synchronized with rotation of the 2nd shift stage driven gear 22b, and the first counter shaft 17 is integrally connected with the 2nd shift stage driven gear 22b so as to establish the 2nd shift stage. Meanwhile, once the sleeve M is shifted towards the 4th shift stage driven gear 24b by the shift fork N, rotation of the first counter shaft 17 is synchronized with rotation of the 4th shift stage driven gear 24b, and then the first counter shaft 17 is connected integrally to the 4th shaft stage driven gear 24b so as to establish the 4th shift stage.

The second gear change mechanism 20B includes a third gear switching unit 20B1 arranged between the first and the second input shafts 15, 16 and the second counter shaft 18, and a fourth gear switching unit 20B2 arranged between the first input shaft 15 and the second counter shaft 18. The third gear switching unit 20B1 includes a 6th shift stage gear train (25a, 25b), a reverse shift stage gear train (27a, 27b, 27c, 27d), and a third switching clutch 30C. The 6th shift stage gear train (25a, 25b) is configured with a driving gear 25a firmly attached to the second input shaft 16 and a driven gear 25b rotatably provided at the second counter shaft 18. The reverse shift stage gear train is configured with a driving gear 27a (which is also described as the 1st shift stage driving gear 21a) firmly attached to the first input shaft 15, a driven gear 27d rotatably provided at the second counter shaft 18, and a pair of idle gears (27b, 27c) integrally formed with each other. The idle gears (27b, 27c) are rotatably arranged on the idle shaft 27e for a reverse operation and further connect the driving gear 27a with the driven gear 27d. Substantively, the synchromesh mechanism is adapted to the third switching clutch 30C. The third switching clutch 30C is configured so as to connect in turns either the driven gear 25b or 27d to the second counter shaft 18 or to disconnect both of the driven gears 25b and 27b therefrom. The third switching clutch 30C, when being located in a neutral position shown in FIG. 1, is engaged with none of engaging members S6 and SR. However, once a sleeve M of the third switching clutch 30C is shifted towards the 6th shift stage driven gear 25b by a shift fork N, rotation of the second counter shaft 17 is synchronized with rotation of the 6th shift stage driven gear 25b, and then the second counter shaft 17 is integrally connected with the 6th shift stage driven gear 25b so as to establish the 6th shift stage. Meanwhile, once the sleeve M is shifted towards the reverse driven gear 27b, rotation of the second counter shaft 18 is synchronized with rotation of the reverse driven gear 27b, and then the second counter shaft 18 is integrally connected to the reverse driven gear 27b so as to establish the reverse shift stage.

The fourth gear switching unit 20B2 includes a 7th shift stage gear train (26a, 26b) and a part of the fourth switching clutch 30D. The 7th shift stage gear train (26a, 26b) is configured with a driving gear 26a rotatably provided at a rear portion of the first input shaft 15 and a driven gear 26b firmly attached to the second input shaft 18. The fourth switching clutch 30D is arranged between the driving gear 26a of the 7th shift stage gear train (26b, 26b) and the driven gear (28b, 29b) The driving gear 26a of the 7th shift stage gear train (26a, 26b) is rotatably provided at the rear portion of the first input shaft 15. The driven gear (28b, 29b) is commonly used by the first and the second reduction gear trains and is coaxially fixed to the front portion of the output shaft 19. The fourth switching clutch 30D is structured with the synchromesh mechanisms, whose structure is the same as that of the first switching clutch 30A. However, the fourth switching clutch 30D differs from the first switching clutch 30A in terms of a clutch hub L being fixed on the rear portion of the first input shaft 15, a fifth engaging member S5 being fixed on the driven gear (28b, 29b) commonly used by the first and the second reduction gear trains (28a, 28b and 29a, 29b) and a seventh engaging member S7 being fixed on the 7th shift stage driving gear

26a. The fourth switching clutch 30D is engaged with none of the engaging member S5, S7, when the fourth switching clutch 30D is located in a neutral position. However, when a sleeve M of the fourth switching clutch 30D is shifted towards the 7th shift stage driven gear 26a by means of a shift fork N, rotation of the first input shaft 17 is synchronized with rotation of the 7th shift stage driving gear 26a so as to establish the 7th shift stage. Meanwhile, when the sleeve M is shifted towards the driven gear (28b, 29b) commonly used by the first and the second reduction gear trains, rotation of the input shaft 15 is synchronized with rotation of the output shaft 19, and the input shaft 15 is connected integrally with the output shaft 19 in order to establish the 5th shift stage.

According to the embodiment, the number of teeth of each gear used for each shift stage, the reverse shift stage and reduction gear trains is designed so that a gear ratio of each shift stage achieves a predetermined value. When the vehicle is driven at the 1st shift stage, a reduction gear ratio between the first input shaft 15 and the output shaft 19 will be the largest, compared to a case where other shift stages for forward movement are selected. When the vehicle reverses in the reverse shift stage, the reduction gear ratio between the first input shaft 15 and the output shaft 19 is equal to or more than the reduction gear ratio established when the vehicle is driven with the 1st shift stage. Further, when the vehicle reverses with the reverse shift stage, a sign indicating the direction of the shaft rotation of the first input shaft 15 and the output shaft 19 is described the other way around from the rotational direction of the shaft rotating when the vehicle is driven with the 1st shift stage. Additionally, when the vehicle is driven the 5th shift stage, as the first input shaft 15 is directly connected to the output shaft 19, a speed change ratio of the 5th shift stage becomes one.

The control device of the dual clutch transmission apparatus in the embodiment operates the first and the second frictional clutches C1, C2 of the dual clutch 12, and also operates the first switching clutch 30A, the second switching clutch 30B, the third switching clutch 30C and the fourth switching clutch 30D depending on a condition of the vehicle, such as an accelerator opening degree, an engine rotational speed, a speed of the vehicle, and the like. When the dual clutch transmission apparatus is not operated, the first and the second frictional clutches C1 and C2 of the dual clutch 12 are both disengaged, which results in the first switching clutch 30A, the second switching clutch 30B, the third switching clutch 30C and the fourth switching clutch 30D being located in a neutral position. When the engine 10 is activated while the vehicle is parked, and then the shift lever of the dual clutch transmission apparatus (not shown) is set to be at the forward movement position, for example, to establish the 1st shift stage as shown in FIG. 3, the control device detects the aforementioned state of the vehicle, engages the first engaging member S1 and further controls the other clutches to be at a neutral position. Once a rotational speed of the engine 10 exceeds a predetermined low rotational speed in response to an increase in an accelerator opening degree, the control device gradually increases an engagement force of the first frictional clutch C1 of the dual clutch 12 in accordance with an amount of the accelerator opening degree. Accordingly, driving torque of the drive shaft 11 is transmitted from the first frictional clutch C1 to the output shaft 19 via the 1st shift stage gear train (21a, 22b) (the driving gear 21a also functions as the rear driving gear 27a), the first switching clutch 30A, the first counter shaft 17 and the first reduction gear train (28a, 28b). As a result, the vehicle starts running at the 1st shift stage.

When the condition of the vehicle becomes suitable for the vehicle to run with the 2nd shift stage because of an increase of the accelerator opening degree, the control device firstly controls the second engaging member S2 of the second switching clutch 30B to be engaged with the clutch hub L so as to establish the 2nd shift stage. Secondly, the control device switches the dual clutch 12 from the first frictional clutch C1 to the second frictional clutch C2 so that the vehicle is driven with the 2nd shift stage. Finally, the control device disengages the first engaging member S1 of the first switching clutch 30A from the clutch hub L so as to establish the condition for the 2nd shift stage indicated in FIG. 3. Likewise, when the vehicle is driven in the condition suitable for the vehicle to run with the 3rd shift stage, the control device selects the shift stage appropriate to the condition of the vehicle, and also switches the dual clutch 12 to the first frictional clutch C1 from the second frictional clutch C2. Similarly, when the condition of the vehicle becomes suitable for the vehicle to run with the 4th shift stage, the control device selects the shift stage appropriate to the condition of the vehicle, and also switches the dual clutch 12 to the second frictional clutch C2 from the first frictional clutch C1.

When the condition of the vehicle becomes suitable for the vehicle to run with the 5th shift stage, the control device firstly controls the fifth engaging member S5 of the fourth switching clutch (switching clutch) 30D to be engaged with the clutch hub L, and further the control device connects the first input shaft 15 and the output shaft 19 so as to establish the 5th shift stage. Secondly, the control device switches the dual clutch 12 to the first frictional clutch C1 from the second frictional clutch C2 so that the vehicle is driven with the 5th shift stage. Finally, the control device controls the fourth engaging member S4 of the second switching clutch 30B to be disengaged from the clutch hub L so as to establish the condition for the 5th shift stage indicated in FIG. 3. Likewise, when the condition of the vehicle becomes suitable for the vehicle to run with the 6th shift stage, the control device firstly engages the sixth engaging member S6 of the third switching clutch 30C with the clutch hub L so as to establish the 6th shift stage. Secondly, the control device switches the dual clutch 12 to the second frictional clutch C2 from the first frictional clutch C1 so that the vehicle is driven with the 6th shift stage. Finally, the control device disengages the fifth engaging member S5 of the fourth switching clutch 30D so as to establish the condition for the 6th shift stage indicated in FIG. 3. In this case, driving torque of the driving shaft 11 is transmitted from the second frictional clutch C2 to the output shaft 19 via the second inputs shaft 16, the 6th shift stage gear train (25a, 25b), the third switching clutch 30C, the second counter shaft 18 and the second reduction gear train (29a, 29b).

When the condition of the vehicle becomes suitable for the vehicle to run with the 7th shift stage, the control device of the dual clutch transmission apparatus firstly controls the seventh engaging member S7 of the fourth switching clutch 30D to be engaged with the clutch hub L so as to establish the 7th shift stage. Secondly, the control device switches the dual clutch 12 to the first functional clutch C1 from the second frictional clutch C2 so that the vehicle is driven with the 7th shift stage. Finally the control device controls the sixth engaging member S6 of the third switching clutch 30C to be disengaged from the clutch hub L so as to establish the condition for the 7th shift stage indicated in FIG. 3. When the vehicle is driven with the 6th shift stage or the 7th shift stage, the speed of rotation of the output shaft 19 becomes faster than that of the driving shaft 11. Additionally, when the condition of the vehicle becomes suitable for the vehicle to run with a low shift stage because of the speed of the vehicle decreases from a certain condition, the control device selects either the first frictional clutch or the second frictional clutch in turns as well as switching gear trains appropriate to the condition of the vehicle.

As described above, switching of the each switching clutch (the first switching clutch 30A, the second switching clutch 30B, the third switching clutch 30C and the fourth switching clutch 30D) corresponding to changes of shift stages is completed under a condition that the dual clutch 12 is switched to either the first frictional clutch C1 or the second frictional clutch C2, and that the dual clutch 12 is disengaged from either the first or the second frictional clutches C1, C2 (for example, when the dual clutch 12 is switched to the first frictional clutch C1, the second frictional clutch C2 is disengaged from the dual clutch 12, and vice versa) so that torque is transmitted to one of the switching clutches (30A, 30B, 30C and 30D) used to establish the shift stage appropriate to the condition of the vehicle. In other words, because the switching of the switching clutches (30A, 30B, 30C and 30D) is completed when either the first frictional clutch C1 or the second frictional clutch C2 is disengaged so that torque is not transmitted to the disengaged clutch, a shift operation for each shift stage in the transmission can be smoothly implemented.

Once a shift lever of the dual clutch transmission apparatus is set to a reverse shift operation position in a situation where the vehicle has stopped with the engine 10 being active, the control device detects the aforementioned state of the vehicle and, as shown in reverse condition in FIG. 3, engages the reverse engaging member SR of the third switching clutch 30C with the clutch hub L so that the other switching clutches are located in a neutral position. As a consequence, the reverse shift stage is formed. Once a rotational speed of the engine 10 exceeds a predetermined low rotational speed in response to an increase in an accelerator opening degree, the control device gradually increases an engagement force of the first frictional clutch C1 of the dual clutch 12 in accordance to an amount of the accelerator opening degree. Accordingly, torque of the driving shaft 11 is transmitted from the first clutch C1 to the output shaft 19 via the first input shaft 15, the reverse shift stage gear train (27a, 27b, 27c and 27d, the driving gear 27a is commonly used by the driving gear 21a of the first shift stage gear train), the reverse engaging member SR of the third switching clutch 30C, the second counter shaft 18 and the second reduction gear train (29a, 29b). As a result, the vehicle starts moving in a rearward direction.

According to the above-mentioned embodiment, rotation of the driving shaft 11 is transmitted to the output shaft 19 via either the first gear change mechanism 20A or the second gear change mechanism 20B. The rotation of the driving shaft 11 is transmitted to the first counter shaft 17 by speed of the rotation being changed by each of the shift stage of the first gear change mechanism 20A. The speed of the rotation of the driving shaft transmitted to the second counter shaft 17 is further changed by the first reduction gear train (28a, 28b) and then transmitted to the output shaft 19. On the other hand, the rotation of the driving shaft 11 is transmitted to the second counter shaft 17 by speed of the rotation being changed by each of the shift stage of the second gear change mechanism 20B. The speed of the rotation of the driving shaft 11 transmitted to the second counter shaft 19 is further changed by the second reduction gear train (29a, 29b) and then transmitted to the output shaft 19. Therefore, a gear ratio between the driving shaft 11 and the output shaft 19 is established on the basis of a gear ratio of the first gear change mechanism 20A being multiplied by a gear ratio of the first reduction gear train (28a, 28b). Similarly, a gear ratio between the driving shaft 11 and the output shaft 19 is established on the basis of a gear ratio of the second gear change mechanism 20B being multiplied by the second reduction gear train (29a, 29b). Hence, if the gear ratio of the each reduction gear trains (28a, 28b) and (29a, 29b) differ therebetween, a maximum and a minimum gear ratio of the each gear trains provided between the driving shaft 11 and the output shaft 19 can be changed. Therefore, a range of gear ratio of the each shift stage gear train arranged between the driving shaft 11 and the output shaft 19 can be widen, and further gear ratio can be freely selected.

In the above-mentioned embodiment, the output shaft 19 is axially arranged to the first input shaft 15 so that the first input shaft 15 and the output shaft 19 can be arranged in series. The first input shaft 15 and the output shaft 19 are connected to be disengageable via the fourth switching clutch 30D. By doing so, the gear ratio between the driving shaft 11 and the output shaft 19 becomes one when the output shaft 19 is connected to the first input shaft 15 by the fourth switching clutch 30D. Moreover, when the each of 1st, 2nd, 3rd and 4th shift stage is selected and the first input shaft 11 and the output shaft 15 is connected, an average gear ratio established on the basis of the first gear change mechanism 20A being multiplied by the first reduction gear train (28a, 28b) becomes less than one, and an average gear ratio established on the basis of the second gear change mechanism 20B being multiplied by the second reduction gear train (29a, 29b) exceeds one. Similarly, when each of 5th, 6th, 7th and reverse shift stage is selected and the first input shaft 11 and the output shaft 19 are connected, an average gear ratio established on the basis of the second gear change mechanism 20B being multiplied by the second reduction gear train (29a, 29b) becomes less than one, and the average gear ratio established on the basis of the first gear change mechanisms 20A being multiplied by the first reduction gear train (28a, 28b) exceeds one. By regulating the gear ratio of the first and the second reduction gear trains (28a, 28b and 29a, 29b), it is possible to conform the average gear ratio to one, the average gear ratio is established on the basis of the first gear change mechanism 20A being multiplied by the first reduction gear train (28a, 28b) or the second gear change mechanism 20B being multiplied by the second reduction gear train (29a, 29b). By doing so, a greatest diameter of each driving gears of the each gear change mechanism 20A and 20B becomes similar to the size of a greatest diameter of each driven gears of the each gear change mechanisms 20A and 20B. Therefore, in proportion to a condition where the average gear ratio of each reduction gear train (28a, 28b and 29a, 29b) dropping from the gear ratio one, maximum diameters of gears comprising of the each gear change mechanisms 20A and 20B is becoming smaller. Hence, the size of the transmission apparatus can be arranged to be smaller.

According to the embodiment of the present invention, the rotation of the driving shaft being changed by the each shift stage of the first gear change mechanism, which is placed between the both input shafts and the first counter shaft, is further changed by the first reduction gear train, and then transmitted to the output shaft. Similarly, the rotation of the driving shaft being changed by the each shift stage of the second gear change mechanism which is placed between the both input shafts and the second counter shaft, is further changed by the second reduction gear train, and then transmitted to the output shaft. A gear ratio between the driving shaft and the output shaft is established on the basis of a gear ratio of the first gear change mechanism being multiplied by a gear ratio of the first reduction gear train, or on the basis of a gear ratio of the second gear change mechanism being multiplied by a gear ratio of the second reduction gear train.

Hence, when a gear ratio of the each reduction gear trains differs therebetween, maximum and minimum ratio of the each gear ratio between the driving shaft and the output shaft can be changed. Thus, a range of each gear ratio between the driving shaft and the output shaft can be flexibly selected.

According to the embodiment of the present invention, when the output shaft is connected to the first input shaft by the switching clutch, the gear ratio between the driving shaft and the output shaft becomes one. Further, an average gear ratio becomes less than one and the average gear ratio is established by one of the gear change mechanisms being multiplied by one of the reduction gear trains that corresponds to the one of the shift gear change mechanisms. On the other hand, an average gear ratio, which is established by the other gear change mechanisms being multiplied by the other reduction gear train corresponding to the other gear change mechanisms, exceeds one. Therefore, by regulating the gear ratio of each reduction gear trains, it is possible to conform the average gear ratio of the each gear change mechanisms close to one. Hence, the maximum diameter of gears comprising the each gear change mechanisms can be reduced, which results in arranging the dual clutch transmission apparatus to be smaller.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A dual clutch transmission apparatus, comprising:
   a first input shaft;
   a second input shaft arranged coaxially with the first input shaft and freely rotatable;
   a first counter shaft arranged in parallel with the first and the second input shafts;
   a second counter shaft arranged in parallel with the first and second input shafts;
   a dual clutch including a first clutch and a second clutch, the first clutch transmitting rotational torque from a power source to the first input shaft and the second clutch transmitting the rotational torque from the power source to the second input shaft;
   a first gear change mechanism provided between the first and the second input shafts and the first counter shaft;
   a second gear change mechanism provided between the first and the second input shafts and the second counter shaft;
   an output shaft connected to the first and the second counter shafts for transmitting the rotational torque from the power source to a driving wheel; wherein the output shaft is connected to the first input shaft via a first reduction gear train and to the second input shaft via a second reduction gear;
   the first gear change mechanism including a first gear switching unit and a second gear switching unit;
   the second gear change mechanism including a third gear switching unit;
   the first gear switching unit including a 1st shift stage gear train, a 3rd shift stage gear train and a first switching clutch;
   the second gear switching unit including a 2nd shift stage gear train, a 4th shift stage gear train and a second switching clutch; and
   the third gear switching unit including a 6th shift gear train, a reverse shift gear train and a third switching clutch.

2. The dual clutch transmission apparatus according to claim 1, wherein the output shaft is arranged in series with the first input shaft and is engageble with or disengageable from the first input shaft via a switching clutch.

3. The dual clutch transmission apparatus according to claim 1, wherein a driving shaft is provided between the power source and the dual clutch so that the rotational torque is transmitted from the power source to the dual clutch.

4. The dual clutch transmission apparatus according to claim 1, wherein the second gear change mechanism includes a fourth gear switching unit.

5. The dual clutch transmission apparatus according to claim 4, wherein the fourth gear switching unit includes a 7th shift stage gear train and a part of a fourth switching clutch.

6. The dual clutch transmission apparatus according to claim 5, wherein the fourth switching clutch is arranged between the first input shaft and the output shaft and when the first input shaft and the output shaft are connected via the fourth switching clutch, a 5th shift stage is established.

\* \* \* \* \*